United States Patent
Gold

(10) Patent No.: US 10,821,519 B2
(45) Date of Patent: Nov. 3, 2020

(54) LASER SHOCK PEENING WITHIN AN ADDITIVE MANUFACTURING PROCESS

(71) Applicant: GENERAL ELECTRIC COMPANY, Schenectady, NY (US)

(72) Inventor: Scott Alan Gold, Waynesville, OH (US)

(73) Assignee: General Electric Company, Schenectady, NY (US)

(*) Notice: Subject to any disclaimer, the term of this patent is extended or adjusted under 35 U.S.C. 154(b) by 373 days.

(21) Appl. No.: 15/631,920

(22) Filed: Jun. 23, 2017

(65) Prior Publication Data

US 2018/0369918 A1    Dec. 27, 2018

(51) Int. Cl.
| | |
|---|---|
| B22F 3/16 | (2006.01) |
| B22F 3/105 | (2006.01) |
| B33Y 30/00 | (2015.01) |
| B33Y 10/00 | (2015.01) |
| C21D 10/00 | (2006.01) |
| B23K 26/356 | (2014.01) |
| B23K 103/00 | (2006.01) |

(52) U.S. Cl.
CPC ............... *B22F 3/16* (2013.01); *B22F 3/105* (2013.01); *B22F 3/1055* (2013.01); *B22F 3/164* (2013.01); *B33Y 10/00* (2014.12); *B33Y 30/00* (2014.12); *B22F 2003/1051* (2013.01); *B22F 2003/1052* (2013.01); *B22F 2003/1056* (2013.01); *B22F 2003/1057* (2013.01); *B22F 2003/1058* (2013.01); *B22F 2998/10* (2013.01); *B23K 26/356* (2015.10); *B23K 2103/50* (2018.08); *C21D 10/005* (2013.01)

(58) Field of Classification Search
CPC ... B22F 3/16; B22F 3/10; B33Y 10/00; B33Y 30/00; B23K 26/10; B23K 26/20
USPC ............... 219/121.12–121.35, 121.6–121.86
See application file for complete search history.

(56) References Cited

U.S. PATENT DOCUMENTS

| | | |
|---|---|---|
| 3,565,676 A | 2/1971 | Holzl |
| 3,594,216 A | 7/1971 | Charles et al. |
| 3,656,995 A | 4/1972 | Reedy, Jr. |
| 5,183,685 A | 2/1993 | Yamazaki |
| 5,241,245 A | 8/1993 | Barnes et al. |
| 5,304,282 A | 4/1994 | Flamm |

(Continued)

FOREIGN PATENT DOCUMENTS

| | | |
|---|---|---|
| DE | 102009051551 A1 | 5/2011 |
| DE | 102011086889 A1 | 5/2013 |
| DE | 102015212529 A1 | 1/2017 |

OTHER PUBLICATIONS

Gujba et al., "Laser Peening Process and Its Impact on Materials Properties in Comparison with Shot Peening and Ultrasonic Impact Peening," Materials, 2014, vol. 7, pp. 7925-7974.

(Continued)

*Primary Examiner* — Phuong T Nguyen
(74) *Attorney, Agent, or Firm* — Dority & Manning, P.A.

(57) ABSTRACT

The present disclosure generally relates to methods and apparatuses for laser shock peening during additive manufacturing (AM) processes. Such methods and apparatuses can be used to embed microstructural and/or physical signatures into manufactured objects, and such embedded chemical signatures may find use in anti-counterfeiting operations and in manufacture of objects with multiple materials.

16 Claims, 11 Drawing Sheets

(56) References Cited

U.S. PATENT DOCUMENTS

| | | | |
|---|---|---|---|
| 5,387,380 | A | 2/1995 | Cima et al. |
| 5,656,329 | A | 8/1997 | Hampden-Smith et al. |
| 6,338,747 | B1* | 1/2002 | Kosco .................... C22C 33/02 |
| | | | 419/11 |
| 6,475,902 | B1 | 11/2002 | Hausmann et al. |
| 6,492,651 | B2 | 12/2002 | Kerekes |
| 6,548,899 | B2 | 4/2003 | Ross |
| 6,743,473 | B1 | 6/2004 | Parkhe et al. |
| 6,861,613 | B1 | 3/2005 | Meiners et al. |
| 7,045,738 | B1 | 5/2006 | Kovacevic et al. |
| 7,148,448 | B2 | 12/2006 | Warren et al. |
| 7,217,102 | B2 | 5/2007 | Rockstroh et al. |
| 7,304,266 | B2* | 12/2007 | Mannava ............. C21D 10/005 |
| | | | 219/121.6 |
| 7,585,450 | B2 | 9/2009 | Wahlstrom et al. |
| 7,621,733 | B2 | 11/2009 | Reynolds et al. |
| 7,690,909 | B2 | 4/2010 | Wahlstrom |
| 7,850,885 | B2 | 12/2010 | Philippi et al. |
| 8,017,055 | B2 | 9/2011 | Davidson et al. |
| 8,222,567 | B2 | 7/2012 | Mathai et al. |
| 8,506,836 | B2 | 8/2013 | Szuromi et al. |
| 9,126,167 | B2 | 9/2015 | Ljungblad |
| 2001/0042397 | A1* | 11/2001 | Clauer .................. B23K 26/03 |
| | | | 73/12.01 |
| 2002/0106412 | A1 | 8/2002 | Rowe et al. |
| 2008/0241404 | A1 | 10/2008 | Allaman et al. |
| 2009/0286007 | A1 | 11/2009 | Brancher et al. |
| 2012/0217226 | A1 | 8/2012 | Bayer et al. |
| 2014/0265049 | A1 | 9/2014 | Burris et al. |
| 2014/0308153 | A1 | 10/2014 | Ljungblad |
| 2014/0334924 | A1 | 11/2014 | Satzger et al. |
| 2014/0361464 | A1 | 12/2014 | Holcomb |
| 2015/0177158 | A1 | 6/2015 | Cheverton |
| 2015/0290881 | A1 | 10/2015 | Ederer et al. |
| 2015/0367448 | A1* | 12/2015 | Buller .................. B23K 26/346 |
| | | | 219/74 |
| 2016/0067779 | A1 | 3/2016 | Dautova et al. |
| 2016/0311164 | A1 | 10/2016 | Miyano |
| 2017/0087670 | A1* | 3/2017 | Kalentics ............... B33Y 10/00 |
| 2017/0165751 | A1* | 6/2017 | Buller .................. B29C 64/307 |
| 2018/0361509 | A1 | 12/2018 | Reznik |

OTHER PUBLICATIONS

Peyre et al., "Laser shock processing: a review of the physics and applications," Optical and Quantum Electronics, vol. 27, 1995, pp. 1213-1229.

German Office Action Corresponding to Application No. 102018114715 dated Sep. 27, 2019.

* cited by examiner

LASER SHOCK PEENING WITHIN AN ADDITIVE MANUFACTURING PROCESS

INTRODUCTION

The present disclosure generally relates to methods and apparatuses for laser shock peening during additive manufacturing (AM) processes. Most commercially available AM machines can be used to build components of only a single material. The methods and systems of the present disclosure may be used to modify the single material during manufacture of an object, would allow additional or improved functionality of many AM components, and allow addition of microstructural and/or physical signatures while making various objects, including components having polymerized inner core portions and well defined outer surfaces, and in processes utilizing these components.

BACKGROUND

Additive manufacturing (AM) or additive printing processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses electromagnetic radiation such as a laser beam, to melt or sinter a powdered material, creating a solid three-dimensional object.

An example of an apparatus for AM using a powdered build material is shown in FIG. 1. The apparatus 140 builds objects or portions of objects, for example, the object 152, in a layer-by-layer manner by sintering or melting a powder material (not shown) using an energy beam 170 generated by a source 150, which can be, for example, a laser for producing a laser beam, or a filament that emits electrons when a current flows through it. The powder to be melted by the energy beam is supplied by reservoir 156 and spread evenly over a powder bed 142 using a recoater arm 146 travelling in direction 164 to maintain the powder at a level 148 and remove excess powder material extending above the powder level 148 to waste container 158. The energy beam 170 sinters or melts a cross sectional layer of the object being built under control of an irradiation emission directing device, such as a laser galvo scanner 162. The galvo scanner 162 may comprise, for example, a plurality of movable mirrors or scanning lenses.

The speed at which the energy beam is scanned is a critical controllable process parameter, impacting the quantity of energy delivered to a particular spot. Typical energy beam scan speeds are on the order of 10 to 1000 millimeters per second. The build platform 144 is lowered and another layer of powder is spread over the powder bed and object being built, followed by successive melting/sintering of the powder by the laser 150. The powder layer is typically, for example, 10 to 100 microns in thickness. The process is repeated until the object 152 is completely built up from the melted/sintered powder material. The energy beam 170 may be controlled by a computer system including a processor and a memory (not shown). The computer system may determine a scan pattern for each layer and control energy beam 170 to irradiate the powder material according to the scan pattern. After fabrication of the object 152 is complete, various post-processing procedures may be applied to the object 152. Post-processing procedures include removal of excess powder by, for example, blowing or vacuuming. Other post processing procedures include a stress relief heat treat process. Additionally, thermal, chemical, and mechanical post processing procedures can be used to finish the object 152.

Most commercial AM machines allow components to be built from only a single component material. For example, powder bed 142 and powder reservoir 156 of the system illustrated in FIG. 1 allow for only a single powder material feedstock to be used to fabricate a component. With rapid maturation of AM technology, more accurate printers and modeling tools may become available at decreasing cost. Accordingly, inexpensive replicas of objects may flood the market, and such replicas may be of inferior quality compared to the original, genuine part. However, neither the consumer nor the manufacturer may be able to distinguish originals from replicas upon simple visual inspection of the intact object. Therefore, it is desirable to be able to microstructurally or physically mark parts—on or below the surface—during AM processes with distinct signatures, to help consumers and manufacturers alike tell apart original, genuine parts from inexpensive, inferior replicas.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In one aspect, the present disclosure relates to a method for fabricating an object, comprising (a) irradiating at least a portion of a given layer of build material with an energy source to form at least one solidified region; (b) providing a subsequent layer of build material; (c) repeating steps (a) and (b) until the object is formed; and (d) at least one step of irradiating at least one portion of the solidified region to modify the density and/or microstructure of the solidified material with minimal ablating or melting of the solidified material. In some aspects, step (d) comprises at least one step of placing a confinement medium over the at least one portion of the solidified region to be irradiated. In some aspects, step (d) comprises at least one step of irradiating the at least one portion of the solidified region through a confinement medium. In some aspects, the method further comprises removing the confinement medium after the at least one step of irradiating the at least one portion of the solidified region through the confinement medium. In some aspects, the build material is a powdered metal. In some aspects, the irradiating in step (a) and the irradiating in step (d) are carried out with the same laser source. In some aspects, the irradiating in step (a) and the irradiating in step (d) are carried out with different energy sources. In some aspects, the irradiating in step (a) is with an electron beam source. In some aspects, the at least one step of irradiating the at least one portion of the solidified region modifies the at least one portion of the solidified region, to form a modified solidified region, wherein the modified solidified region differs from the solidified region in one or more of the following ways: the modified solidified region is more opaque to x-rays than the solidified region; the modified solidified region is more opaque to radioactivity than the solidified region; the modified solidified region has a different density than the solidified region; the modified solidified region has a different microstructure than the solidified region; the modified solidified region has different internal stresses from the solidified region; and the modified solidified region has a different absorbance energy than the solidified region as measured by computed tomography (CT) scanning. In some aspects, the microstructure of the modified solidified region includes a difference in one or more of the crystalline structure grain size, and grain orientation of the solidified region. In some aspects, the modified solidified region is in a region of the object susceptible to one or more of fatigue, cracking, or other mechanical failure modes. In some aspects, the confinement medium is selected from glass, polymer, quartz, multi-layer materials, and liquid-filled capsules.

In another aspect, the present disclosure relates to an apparatus for metal-based additive manufacturing, comprising: a laser source; a powder dispenser; a confinement medium dispenser; and a positioning unit to move the confinement medium dispenser in at least two dimensions. In some aspects, the apparatus further comprises a galvo scanner. In some aspects, the apparatus further comprises a confinement medium storage container. In some aspects, the powder is a metal powder. In some aspects, the confinement medium dispenser is attached to a recoater arm. In some aspects, the confinement medium dispenser is adapted to dispense a confinement material onto a layer of a solidified build material. In some aspects, the confinement medium is selected from glass, polymer, quartz, multi-layer materials, and liquid-filled capsules. In some aspects, the apparatus further comprises an electron beam source. In some aspects, the apparatus further comprises a recoater arm, wherein the confinement medium dispenser is not attached to the recoater arm.

These and other aspects of the invention will become more fully understood upon a review of the detailed description, which follows.

DETAILED DESCRIPTION

Figure 1:
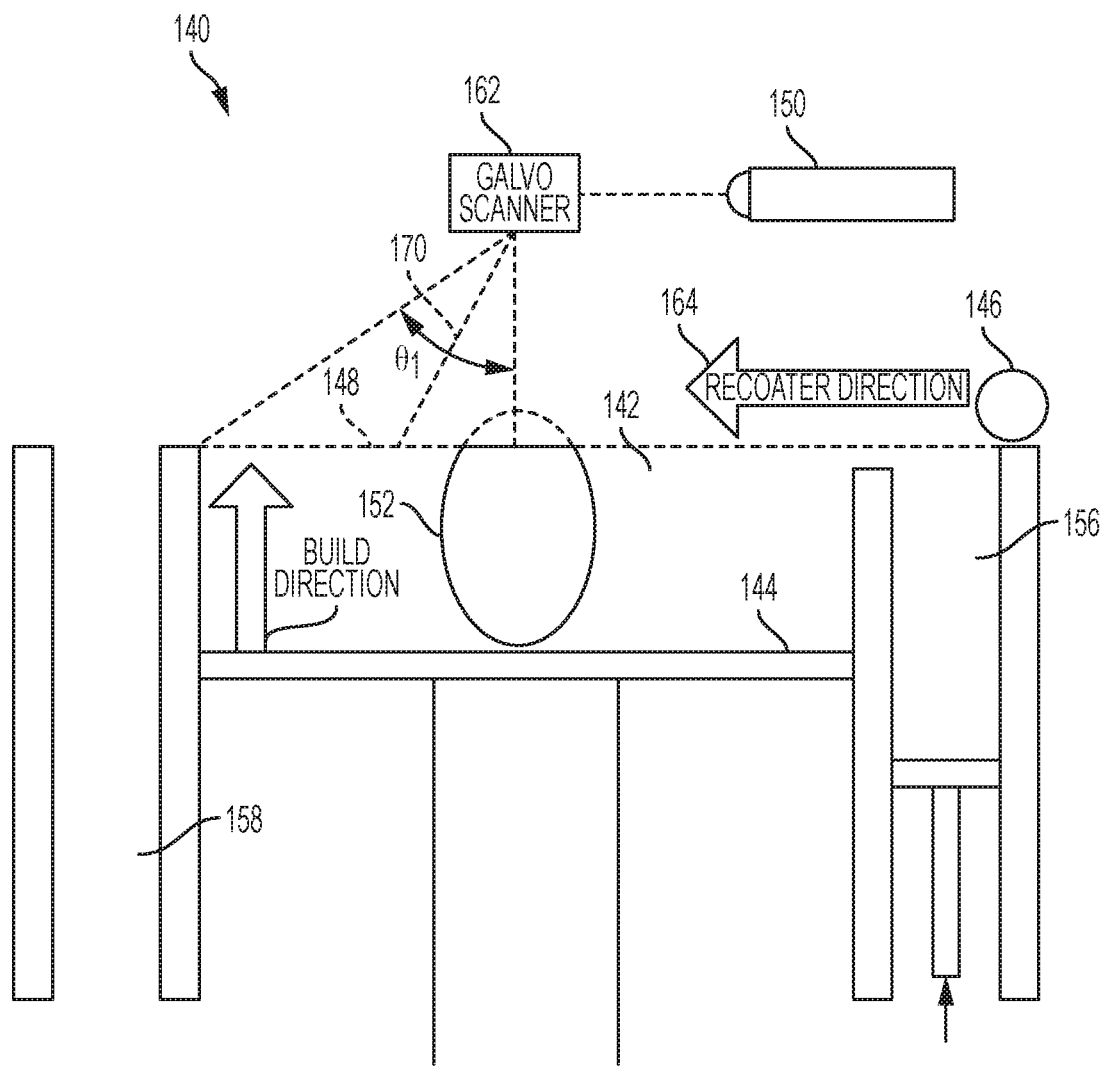
FIG. 1 shows an example of an apparatus for AM according to conventional methods.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present application is directed to methods and apparatuses for laser shock peening (LSP) during additive manufacturing (AM) processes. LSP may be used during AM processes to add microstructural and/or physical signatures during manufacturing, thus facilitating the process of telling original products apart from replicas that may be of inferior quality.

According to the present disclosure, LSP is used to modify a portion of one or more layers of an object being built in a layer-by-layer manner by an AM process. The modification may occur on a recently solidified layer, or component layer. The component layer may be the first layer, the final layer, or an intermediate layer of the object being built. However, by using LSP after building the first layer but before building the final layer of the object during AM, an identifying microstructural and/or physical marker may be able to be placed out of sight of would-be copycats, thereby making it harder for would-be copycats to produce replicas of the object and making it easier to identify replicas or counterfeits. Objects built in such a manner, with internal LSP-derived markers, may be able to be identified by spectroscopic or imaging methods by the consumer, the manufacturer, or a third party. Alternatively, the LSP methods of the present disclosure may also form objects built from a single material but showing different material properties, with LSP modifications conferring properties such as, but not limited to, greater mechanical resistance, greater corrosion resistance, and greater electrical conductivity.

In some embodiments of the present disclosure, LSP is used with a confinement medium. In alternate embodiments of the present disclosure, LSP is used without a confinement medium. Without wishing to be bound to any particular theory, a confinement medium may serve to confine the shock wave generated by absorbance of a sufficiently energetic laser beam contacting the build surface and force the shock wave to densify, to change the material microstructure, or to cause other changes in the solidified build material described elsewhere in the present specification.

As used herein, a material is "opaque" to radiation if the material does not transmit incoming radiation.

As used herein, "radiation" refers to energy in the form of waves or particles, including, but not limited to, heat, radio waves, visible light, x-rays, radioactivity, acoustic radiation, and electromagnetic radiation.

FIGS. 2A-2D and 3A-3D show schematic diagrams of an apparatus for using LSP during AM according to the present disclosure.

Figure 2A:
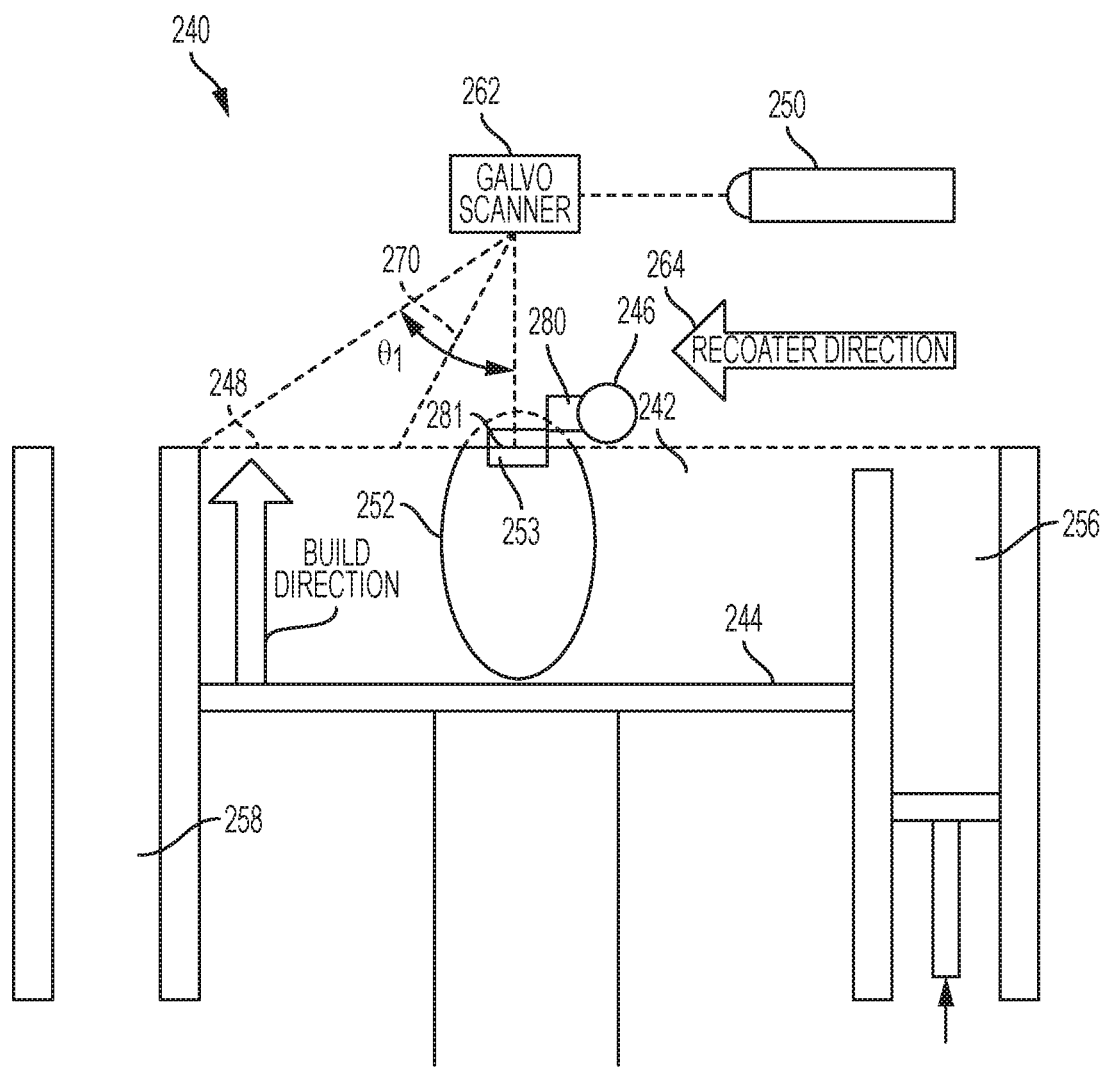
FIG. 2A shows a schematic diagram of placing a confinement medium over a portion of a solidified region of an object, according to a first embodiment of the present invention.

According to a first embodiment of the present disclosure, apparatus 240 may be equipped with a dispenser unit 280. In a first embodiment, dispenser unit 280 may be attached to a recoater mechanism, such as recoater arm 246 (FIG. 2A). After the formation of at least one solidified region of a build material during the manufacture of an object 252, dispenser unit 280 deposits a confinement medium 281 over at least a portion 253 of the solidified region of the most recently solidified or fused layer of object 252 (see FIG. 2A).

Dispenser unit 280 deposits a confinement medium 281 that is an inertial tampering/plasma confining transparent overlay over at least a portion of one or more solidified regions of a recently solidified or fused layer of a build material. The dispenser unit 280 may be used to deposit any confinement material suitable for use in conjunction with apparatus 240 and the build material. Materials suitable for use as confinement materials, or confinement media, include, but are not limited to, glass, polymer, quartz, multi-layer materials, or liquid-filled capsules. The multi-layer materials may include two or more layers of material (s) suitable for use as confinement materials. The liquid-filled capsules may be filled with liquids suitable for use as confinement materials, including but not limited to water, and the walls of the capsules may comprise one or more materials suitable for use as confinement media. In some aspects, dispenser unit 280 is further configured to store one or more confinement media 281. In some aspects, the apparatus 240 further comprises a confinement medium storage unit configured to store one or more confinement media 281.

The method and apparatus of the present disclosure involve localized LSP, for site-specific modification of a build material during AM, which offers advantages over the art. For example, localized LSP during AM enables the embedding of watermarks or other physical markers beneath the surface of a manufactured object 252. In addition, the method and apparatus of the present disclosure may facilitate the anti-counterfeiting operations.

In some aspects, the dispenser unit 280 may be used to modify solidified build material in object 252 with desirable properties, such as for tagging, identification, or anti-counterfeiting purposes and related detection methods, or to impart desirable material properties to the manufactured object. In some aspects, the modified material, or modified solidified region, may be more opaque to x-ray radiation than the build material. In some aspects, the modified material may be more opaque to radioactivity than the unmodified solidified build material. Preferably, the modified material differs from the additive build material in one or more physicochemical properties, a non-exhaustive list of examples of which is provided in the following discussion. In some aspects, the modified material may have a different density than the build material in the solidified state. In some aspects, the modified material has a higher density than the build material in the solidified state. In some aspects, the modified material may have a different fatigue strength than the build material in the solidified state. In some aspects, the modified material has different crack resistance than the build material. In some aspects modification of a portion of the solidified build material results in an advantageous change in the internal stress profile of the component. For example, LSP modification of a portion of the solidified build material may reduce the need for support structures in the build as well as reduce the need for post-process operations and enable many types of structures to be more easily made. In some aspects, the modified material has greater corrosion resistance than the build material. Additionally, compared to the additive build material, the modified material may differ of at least one of infra-red (IR) emissivity, IR absorptivity or reflectivity, ultra-violet (UV) absorptivity or reflectivity, secondary x-ray emission energy profile, neutron scattering profile, surface energy, coefficient of friction, thermal conductivity, electrical conductivity. In some aspects, the modified material has different hardness than the build material. In some aspects, the modified material is more opaque to x-rays than the solidified region. In some aspects, the modified material is more opaque to radioactivity than the solidified region. In some aspects, the modified material has a different absorbance energy than the solidified region as measured by computed tomography (CT) scanning. In some aspects, the modified solidified region has a different microstructure than the solidified region. The microstructural changes may impact one or more of the crystalline structure, grain size, and grain orientation of the unmodified solidified build material. According to the methods of the present disclosure, the density and/or microstructure are modified with minimal ablating or melting of the solidified material.

As used herein, "minimal" ablating or melting of the solidified material means that no more than 10% of the solidified material is removed through ablating or melting while the laser is used to modify the density and/or microstructure of the solidified material. Preferably, the amount of ablating or melting in this step is lower than the minimal amount. For example, it is preferred that the amount of ablated material is no more than 5%, more preferably no more than 1%, even more preferably no more than 0.1%, most preferably no more than 0.01% of the solidified material is ablated or melted. The degree of ablation or melting can be determined by any suitable means known to those of ordinary skill in the art, including but not limited to comparing the area of solid material within a layer before and after irradiation of the solid material to modify its density and/or microstructure.

In some aspects, the build material is modified by LSP in a single layer. In some aspects, the build material is modified by LSP over multiple layers, to obtain a 3D contrast image.

Figure 2B:
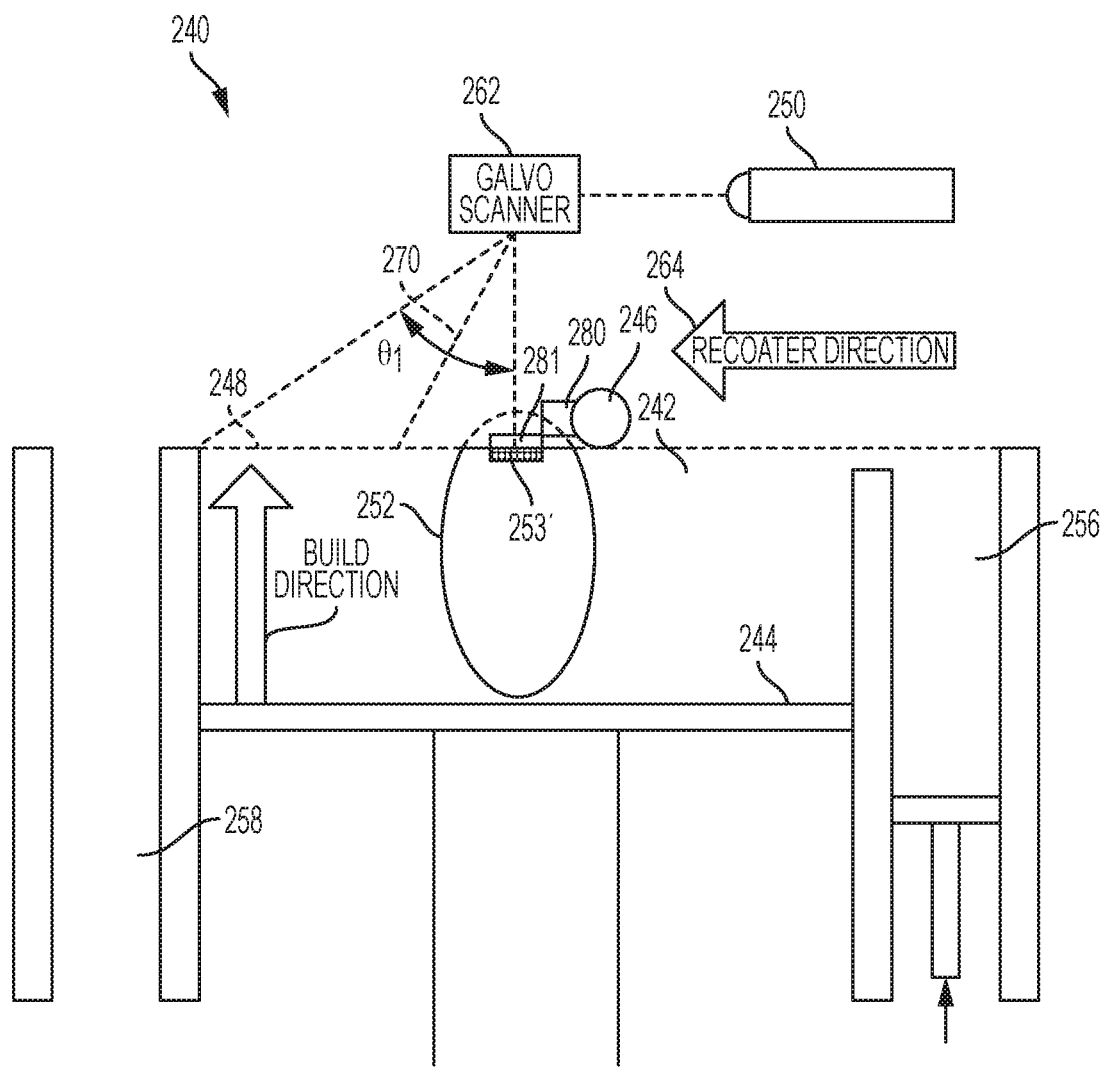
FIG. 2B shows a schematic diagram of irradiating a portion of a solidified region of an object through a confinement medium, according to a first embodiment of the present disclosure.

After the confinement medium 281 has been deposited over region 253 of the most recently solidified or fused layer of object 252, region 253 is irradiated by energy beam 270 under control of an irradiation emission directing device, such as a galvo scanner 262 (see FIG. 2B). The galvo scanner 262 may comprise, for example, a plurality of movable mirrors or scanning lenses. The speed at which the laser is scanned is a critical controllable process parameter, impacting how long the laser power is applied to a particular spot. Typical laser scan speeds are on the order of 10 to 1000 millimeters per second. Energy beam 270 travels through confinement medium 281, generating a high pressure confined plasma and sending shock waves into region 253, generating modified region 253' (see FIG. 2B). The plasma and shock waves may be further confined in some aspects by the use of an opaque ablative layer between confinement medium 281 and region 253. The shock waves may modify region 253 in one or more of the following properties: density, fatigue strength, crack resistance, hardness, internal stress, and susceptibility to other mechanical failure modes. Preferably, the shock waves improve or enhance region 253 in one or more of density, fatigue strength, internal stress, crack resistance and hardness, and/or reduces the susceptibility to other mechanical failure modes.

In some aspects, the modified solidified region is in a region of the object susceptible to one or more of fatigue, cracking, or other mechanical failure modes. Susceptibility of the finished object or part to mechanical failure may be based on the design and/or use case. For example, a portion of the part may be load bearing on an engine, such as but not limited to a support strut or bolt attachment. Another portion of the same object or part may be subject to minimal mechanical stress (e.g., a cooling line). In some aspects, the portions of the part that are load bearing or subject to particular stresses would be the areas treated. Conventional LSP may be used as a post-process operation to areas of parts most subject to high stresses and mechanical failures to improve object life. As another example, stresses may arise as part of the build process. For example, internal thermal stresses build up during the additive process and can result in distortion or even cracking of parts during the build, during post-processing, or in use. In some aspects, the use of various types of support structures to build the part in place during the build combined with post-process thermal treatments may relieve such internal stresses. The in-process LSP approach of the present disclosure may provide an additional mechanism to relieve such internal stresses.

The energy source may emit radiation at any wavelength suitable for use in additive printing methods, as will be known to those of skill in the art. In some aspects, the energy source may be a laser for producing a laser beam. In some aspects, the energy source may be an electron beam source, such as a filament that emits electrons when a current flows through it. In some aspects, a single energy source is used to irradiate at least a given portion of a given layer of build material to form at least one solidified region and to irradiate at least one portion of the solidified region through a confinement medium to form a modified solidified material. In some such aspects, the single energy source is a laser source. In other aspects, different energy sources are used to irradiate at least a portion of a given layer of build material to form at least one solidified region and to irradiate at least one portion of the solidified region through a confinement medium to form a modified solidified material. In some such aspects, both irradiations may be with a laser source. In other such aspects, one irradiation may be with a laser source and the other with an electron beam source, the electron beam source optionally focused using one or more magnets. In still other such aspects, both irradiations may be with an electron beam source, optionally focused using one or more magnets. In some aspects, the different energy sources may be two separate energy sources, such as two laser sources, two electron beam sources each independently optionally focused using one or more magnets, or one laser source and one electron beam source, the electron beam source optionally focused using one or more magnets. In other aspects, the different energy sources may be created from a single energy source (i.e., a single laser source or a single electron beam source) by using a splitter, optionally with separate galvo scanners, separate magnets, or other separate optics.

Figure 2C:
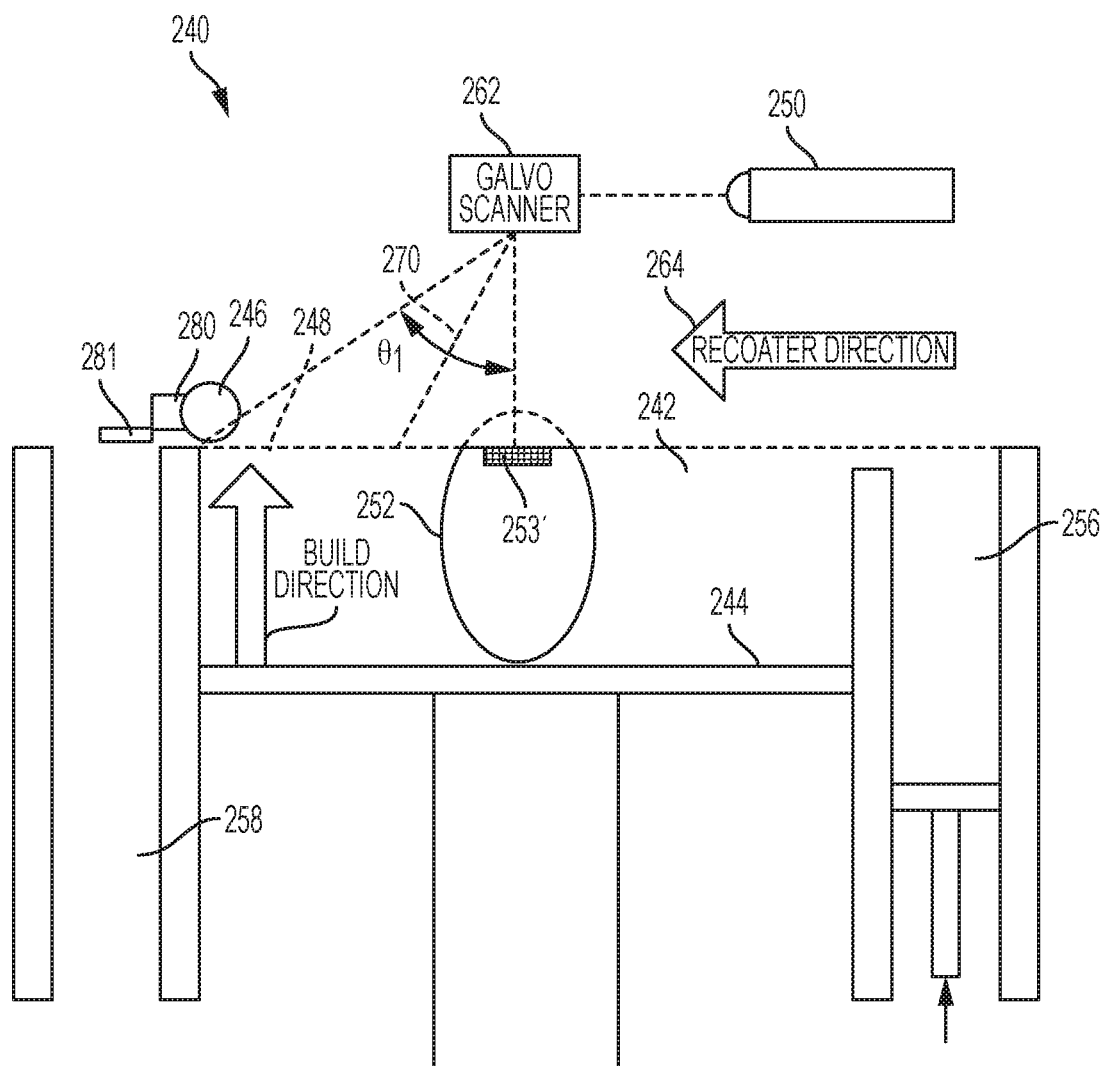
FIG. 2C shows a schematic diagram of removing the confinement medium after irradiation through the confinement medium, according to a first embodiment of the present disclosure.

After irradiation to form modified region 253', the confinement medium 281 may be removed and discarded, by any suitable means. In some aspects, dispenser unit 280 is further configured to remove confinement medium 281. In some aspects, dispenser unit 280 is further configured to remove and discard confinement medium 281. In some aspects, confinement medium 281 is discarded into waste container 258 (FIG. 2C). In some aspects, apparatus 240 contains a separate waste container for confinement mediums 281. In some aspects, confinement mediums 281 may be removed and discarded after irradiation to form modified region 253'. In some aspects, confinement mediums 281 may be removed and discarded before irradiation to form modified region 253', for example, if confinement medium 281 is improperly placed.

Figure 2D:
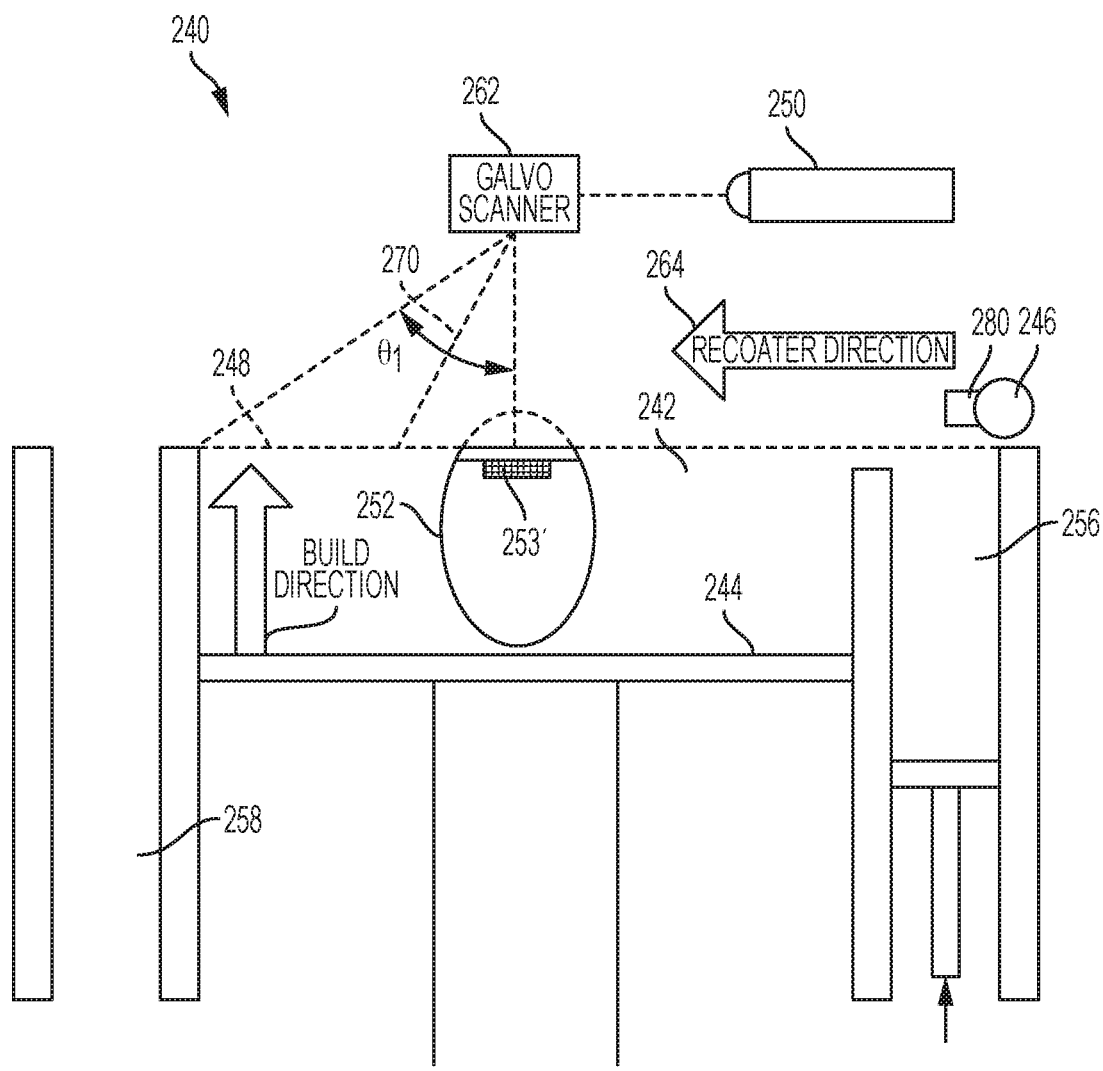
FIG. 2D shows a schematic diagram of applying and irradiating a subsequent layer of build material over the solidified layer formed as shown in FIG. 2B, according to a first embodiment of the present disclosure.

After removal of confinement medium 281 after forming modified region 253', build plate 244 is lowered, and recoater arm 246 evenly spreads a subsequent layer of build material over powder bed 242 and the most recently solidified layer of object 252 (see FIG. 2D). In some aspects, the subsequent layer of build material is spread over the modified region 253'. In some aspects, no subsequent layer of build material is spread over the modified region 253'. The energy beam 270 sinters or melts a cross-sectional layer of the object 252 being built under control of an irradiation emission directing device, such as a galvo scanner 262. The build platform 244 is lowered and another layer of powder is spread over the powder bed and object being built, followed by successive melting/sintering of the powder by the laser 250. The powder layer is typically, for example, 10 to 100 microns in thickness. The process is repeated until the object 252 is completely built up from the melted/sintered powder material. The laser 250 may be controlled by a computer system (not shown) including a processor and a memory. The computer system may determine a scan pattern for each layer and control laser 250 to irradiate the powder material according to the scan pattern. After fabrication of the object 252 is complete, various post-processing procedures may be applied to the object 252. Post processing procedures include removal of excess powder by, for example, blowing or vacuuming. Other post processing procedures include a stress release process. Additionally, thermal and chemical post processing procedures can be used to finish the object 252.

As shown in FIGS. 2A-2D, the dispenser unit 280, may be advantageously attached to the recoater mechanism (e.g. recoater arm 246) to allow two- or three-dimensional movement of the dispenser unit 280 around the build environment.

Figure 2E:
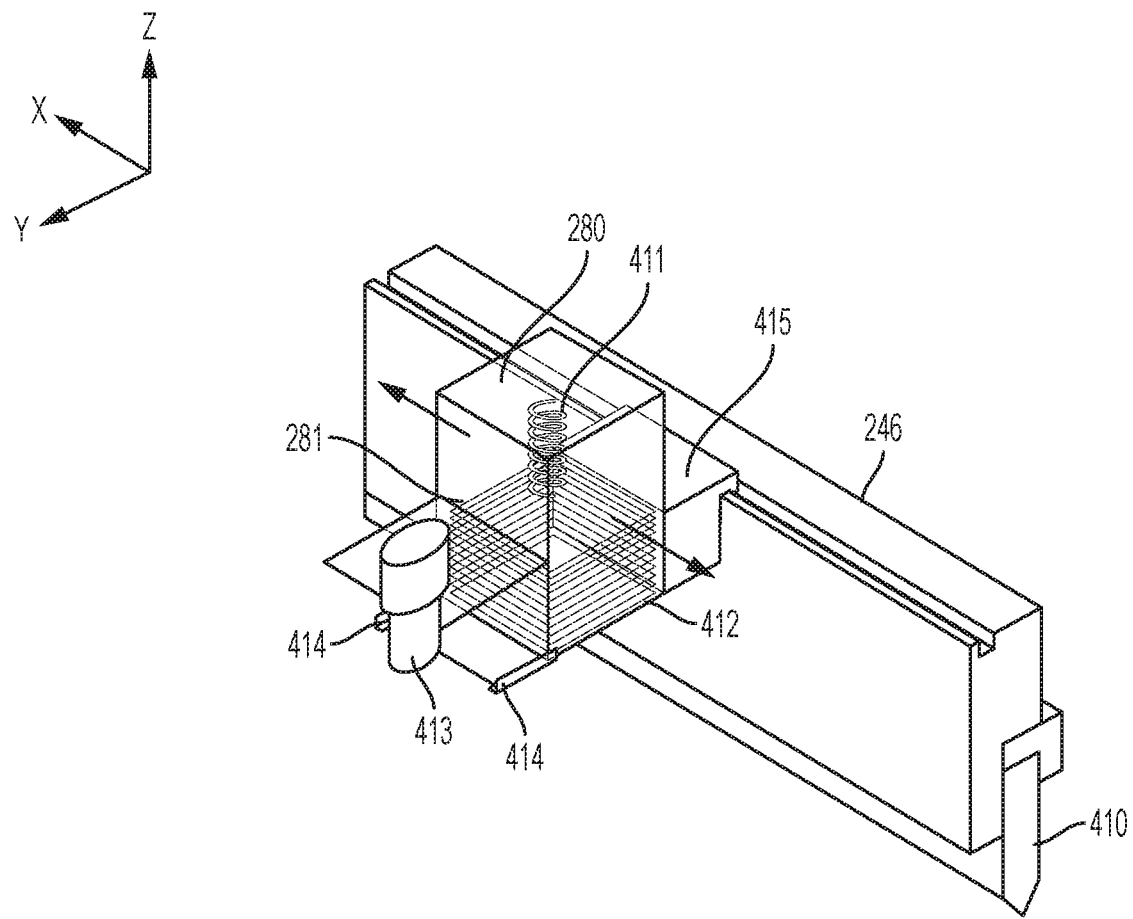
FIG. 2E shows an example of a dispenser unit for use according to a first embodiment of the present disclosure.

FIG. 2E shows an example of a dispenser unit 280 attached to a recoater arm 246. The normal motion of the recoater arm 246 enables positioning in one dimension (direction 264 in FIGS. 2A-2D or the direction indicated by the arrow "Y" in FIG. 2E). Utilizing the recoater arm as a rail in conjunction with a mechanism to enable motion along the rail allows motion in a second dimension (the direction indicated by the arrow "X" in FIG. 2E). In one embodiment, this mechanism to enable motion is a linear gear and motor. In a further embodiment, this mechanism is a motor mounted to the recoater arm 246 in conjunction with a drive belt attached to the dispenser unit 280. In a further embodiment, the mechanism of motion is a slot-electric motor or a mag-lev drive. The motion of the build surface allows motion in a third dimension (the direction indicated by the arrow "Z" in FIG. 2E).

A key aspect of the invention is the need for the confinement medium 281 to be somehow contained and/or released close to the build surface. This is because, if the confinement medium 281 is not confined or released sufficiently close to the build surface, it would be difficult to control precisely where the confinement medium 281 is deposited. It is necessary that the confinement medium 281 is released no more than 2 cm away from the build surface in order to be sufficiently close, preferably 0.01-0.1 cm. Preferably, the confinement medium is dispensed to make contact with the build surface. In other aspects, the confinement medium is dispensed to leave a gap of no more than 0.1 mm between the confinement medium and the build surface. The gap may be established and/or measured by any suitable means known in the art. For this reason, it may be advantageous that the recoater arm 246 is operable to further move and position the dispenser unit 280 in a vertical direction (e.g. as indicated by the arrow "Z" in FIG. 2E). Additionally, in certain embodiments, the recoater arm 246 (FIG. 2E) may be operable to move and position the dispenser unit 280 in direction 264 (FIGS. 2A-2D) or the direction indicated by the arrow "Y" in FIG. 2E. Additionally, movement along the length of the recoater arm 246 itself (e.g. as indicated by the arrow "X" in FIG. 2E) allows movement and positioning in a second direction. Importantly, the proximity of the dispenser unit 280 on recoater arm 246 to the powder bed 242 ensures that the dispenser unit 280 is sufficiently close to the powder bed 242 and the build surface. Movement along the length of the recoater arm 246 may be facilitated using a drive motor and a linear gear mechanism, a drive motor and drive belt, slot-electric motor drive, or a mag-lev (magnetic levitation) drive.

FIG. 2E shows a close-up view of dispenser unit 280 attached to a recoater arm 246, according to a first embodiment of the present disclosure. In some aspects, the recoater arm 246 may comprise a recoater blade 410. In some aspects, dispenser unit 280 comprises a spring 411, a slide piston 412, a vacuum piston 413, one or more guide rails 414, and one or more confinement mediums 281. A confinement medium 281 is pushed, via slide piston 412, onto guide rails 414 and vacuum piston 413. Vacuum piston 413 then deposits confinement medium 281 onto at least a portion 253 of one or more fused or solidified regions of the most recently solidified or fused layer of build material in the manufacture of object 252. In some aspects, slide piston 412 may be coupled to a gas source to facilitate pushing of confinement medium 281 (and partial release of spring 411) onto guide rails 414 and vacuum piston 413.

FIG. 2E shows the housing 415 which serves not only as a frame to hold the dispenser unit 280 with spring 411, slide piston 412, vacuum piston 413, and guide rails 414, but to also position the placement of confinement mediums 281, e.g., a stack of glass slides. The vacuum piston 413 and guide rails 414 extending downward (i.e. away from spring 411 and toward the build surface) ensure that the confinement medium 281 is placed on the build surface. The small gap existing between the bottom of the guide rails 414 and the build surface allows clearance allowing movement of the recoater blade 410. The vertical movement of the dispenser unit 280 allows removal of confinement mediums 281 from the build surface.

According to a second embodiment of the present disclosure, apparatus 240 may be equipped with a dispenser unit 280. In a second embodiment, dispenser unit 280 may be attached to a positioning unit, such as positioning unit 283 (FIG. 3A), which may be separate from a recoater mechanism. The positioning unit 283 is shown in further detail in FIG. 3E. The powder bed apparatus shown in FIG. 3A may have identical features to that shown in FIG. 2A. All aspects described with respect to the dispenser unit 280 attached to recoater arm 246 (FIGS. 2A-2D) apply with equal force to the dispenser unit 280 attached to the positioning unit 283 (FIGS. 3A-3D). After the formation of at least one solidified region of a build material during the manufacture of an object 252, dispenser unit 280 deposits a confinement medium 281 over at least a portion 253 of the solidified region of the most recently solidified or fused layer of object 252 (see FIG. 3A).

Dispenser unit 280 deposits a confinement medium 281 that is an inertial tampering/plasma confining transparent overlay over at least a portion of one or more solidified regions of a recently solidified or fused layer of a build material. The dispenser unit 280 may be used to deposit any confinement material suitable for use in conjunction with apparatus 240 and the build material. Materials suitable for use as confinement materials, or confinement mediums, include, but are not limited to, glass, polymer, quartz, multi-layer materials, and liquid-filled capsules. The multi-layer materials may include two or more layers of materials suitable for use as confinement materials. The liquid-filled capsule may be filled with one or more liquids, such as but not limited to, water, and the capsule walls may comprise one or more materials suitable for use as confinement materials. In some aspects, dispenser unit 280 is further configured to store one or more confinement mediums 281. In some aspects, the apparatus 240 further comprises a confinement medium storage unit configured to store one or more confinement mediums 281.

The method and apparatus of the present disclosure involve localized LSP, for site-specific modification of a build material during AM, which offers advantages over the art. For example, localized LSP during AM enables the embedding of watermarks or other physical markers beneath the surface of a manufactured object 252. In addition, the method and apparatus of the present disclosure may facilitate the anti-counterfeiting operations.

In some aspects, the dispenser unit 280 may be used to modify solidified build material in object 252 with desirable properties, such as for tagging, identification, or anti-counterfeiting purposes and related detection methods, or to impart desirable material properties to the manufactured object. In some aspects, the modified material, or the modified solidified region, may be more opaque to x-ray radiation than the build material. In some aspects, the modified material may be more opaque to radioactivity than the unmodified solidified build material. Preferably, the modified material differs from the additive build material in one or more physicochemical properties, a non-exhaustive list of examples of which is provided in the following discussion. In some aspects, the modified material may have a different density than the build material in the solidified state. In some aspects, the modified material may have a different fatigue strength than the build material in the solidified state. In some aspects, the modified material has different crack resistance than the build material in the solidified state. In some aspects, modification of a portion of the solidified build material results in an advantageous change in the internal stress profile of the component. For example, LSP modification of a portion of the solidified build material may reduce the need for support structures in the build as well as reduce the need for post-process operations and enable many types of structures to be more easily made. In some aspects, the modified material has greater corrosion resistance than the build material. Additionally, compared to the additive build material, the modified material may differ of at least one of infra-red (IR) emissivity, IR absorptivity or reflectivity, ultra-violet (UV) absorptivity or reflectivity, secondary x-ray emission energy profile, neutron scattering profile, surface energy, coefficient of friction, thermal conductivity, electrical conductivity. In some aspects, the modified material has different hardness than the build material. In some aspects, the modified material has a different absorbance energy than the solidified region as measured by CT scanning. In some aspects, the modified solidified region has a different microstructure than the solidified region. The microstructural changes may impact one or more of the crystalline structure, grain size, and grain orientation of the unmodified solidified build material.

In some aspects, the build material is modified by LSP in a single layer. In some aspects, the build material is modified by LSP over multiple layers, to obtain a 3D contrast image.

Figure 3A:
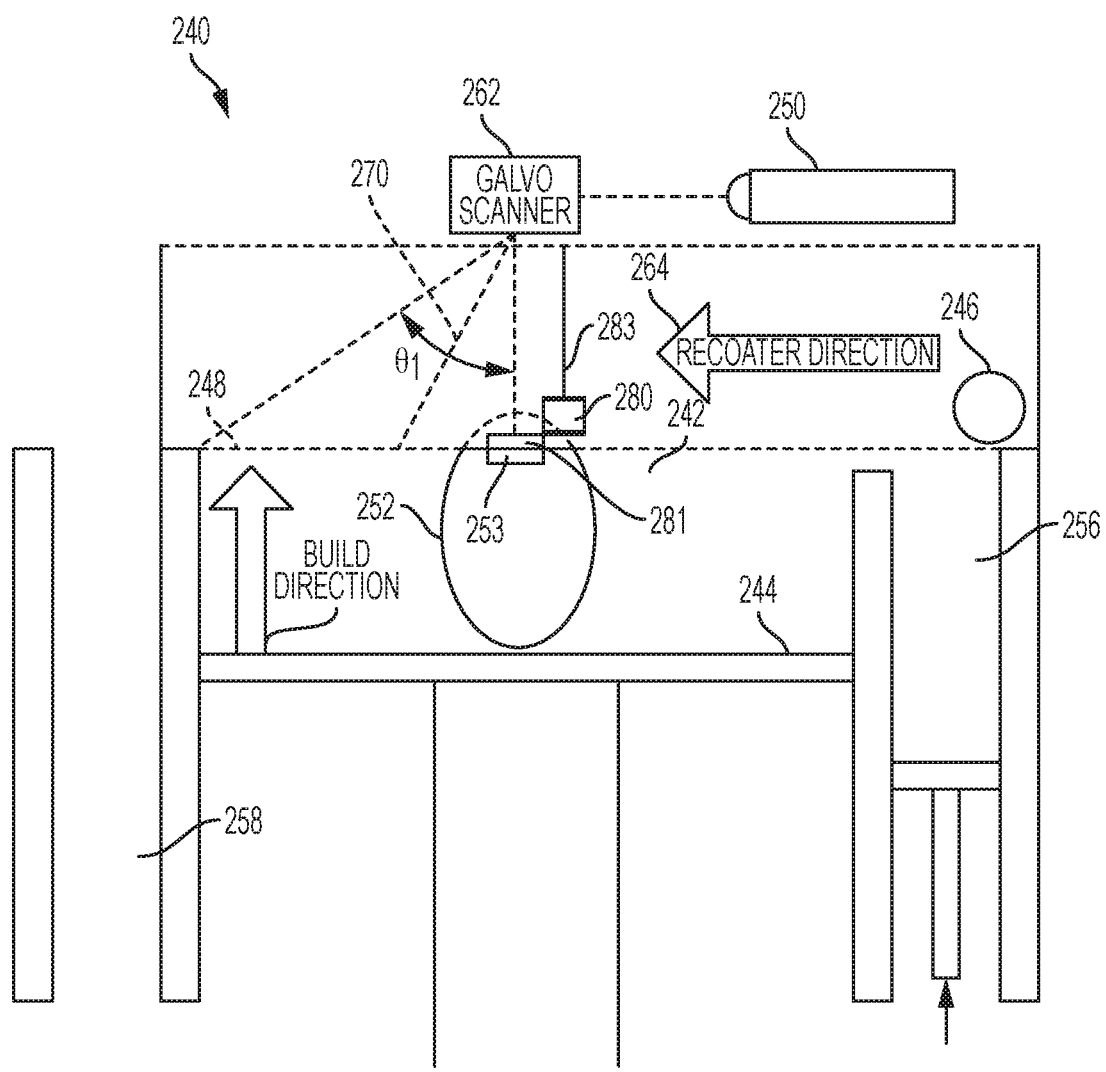
FIG. 3A shows a schematic diagram of placing a confinement medium by a separate positioning unit over a portion of a solidified region of an object, according to a second embodiment of the present invention.
Figure 3B:
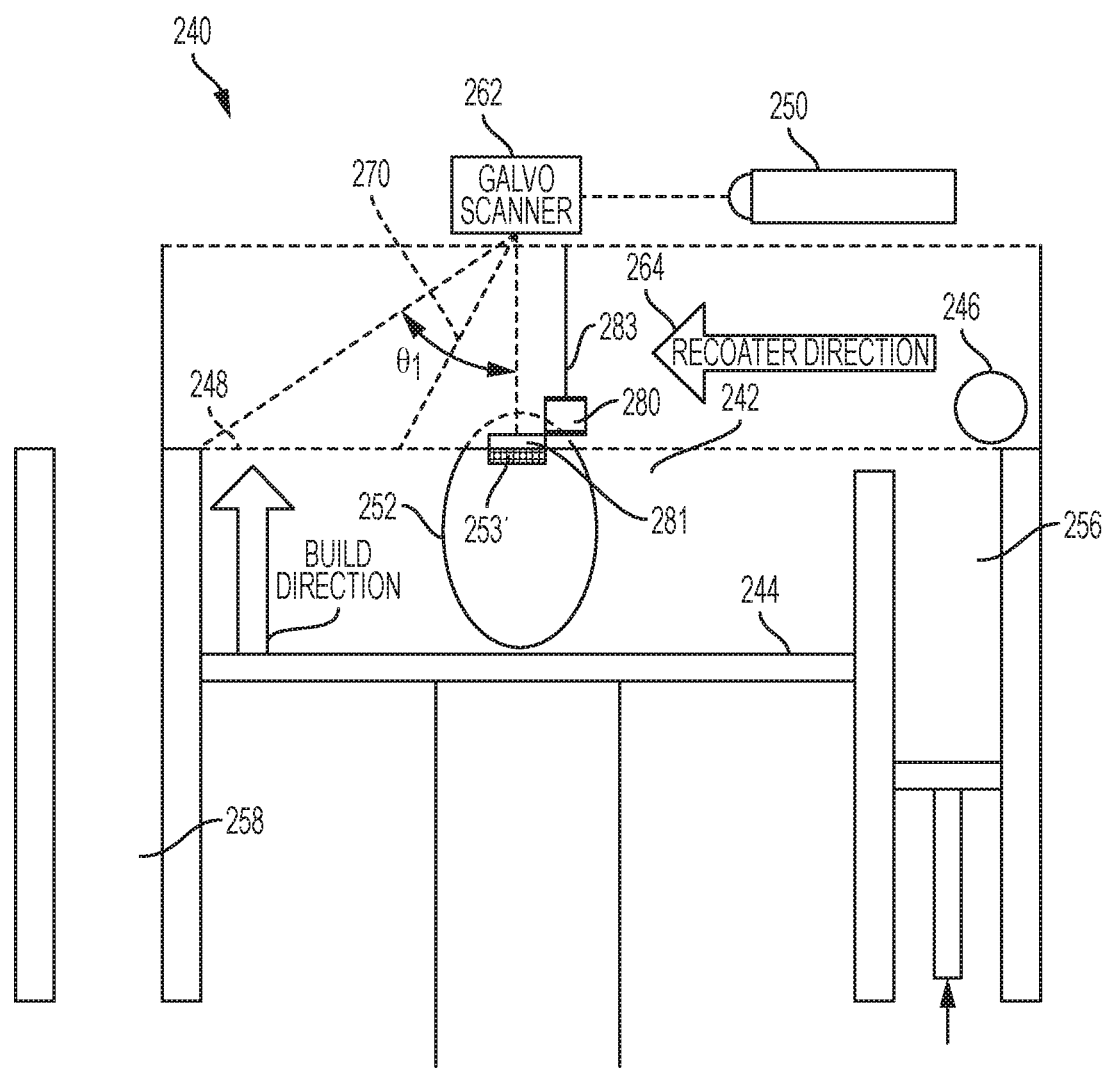
FIG. 3B shows a schematic diagram of irradiating a portion of a solidified region of an object through a confinement medium placed by a separate positioning unit, according to a second embodiment of the present disclosure.

After the confinement medium 281 has been deposited over region 253 of the most recently solidified or fused layer of object 252, region 253 is irradiated by energy beam 270 under control of an irradiation emission directing device, such as a galvo scanner 262 (see FIG. 3B). The galvo scanner 262 may comprise, for example, a plurality of movable mirrors or scanning lenses. The speed at which the laser is scanned is a critical controllable process parameter, impacting how long the laser power is applied to a particular spot. Typical laser scan speeds are on the order of 10 to 1000 millimeters per second. Energy beam 270 travels through confinement medium 281, generating a high pressure confined plasma and sending shock waves into region 253, generating modified region 253' (see FIG. 3B). The plasma and shock waves may be further confined in some aspects by the use of an opaque ablative layer between confinement medium 281 and region 253. The shock waves may modify region 253 in one or more of the following properties: density, fatigue strength, crack resistance, hardness, internal stress, and susceptibility to other mechanical failure modes. Preferably, the shock waves improve or enhance region 253 in one or more of density, fatigue strength, internal stress, crack resistance and hardness, and/or reduces the susceptibility to other mechanical failure modes.

In some aspects, the modified solidified region is in a region of the object susceptible to one or more of fatigue, cracking, or other mechanical failure modes. Susceptibility of the finished object or part to mechanical failure may be based on the design and/or use case. For example, a portion of the part may be load bearing on an engine, such as but not limited to a support strut or bolt attachment. Another portion of the same object or part may be subject to minimal mechanical stress (e.g., a cooling line). In some aspects, the portions of the part that are load bearing or subject to particular stresses would be the areas treated. Conventional LSP may be used as a post-process operation to areas of parts most subject to high stresses and mechanical failures to improve object life. As another example, stresses may arise as part of the build process. For example, internal thermal stresses build up during the additive process and can result in distortion or even cracking of parts during the build, during post-processing, or in use. In some aspects, the use of various types of support structures to build the part in place during the build combined with post-process thermal treatments may relieve such internal stresses. The in-process LSP approach of the present disclosure may provide an additional mechanism to relieve such internal stresses.

The energy source may emit radiation at any wavelength suitable for use in additive printing methods, as will be known to those of skill in the art. In some aspects, the energy source may be a laser for producing a laser beam. In some aspects, the energy source may be an electron beam source, such as a filament that emits electrons when a current flows through it. In some aspects, different energy sources are used to irradiate at least a portion of a given layer of build material to form at least one solidified region and to irradiate at least one portion of the solidified region through a confinement medium to form a modified solidified material. In some such aspects, both irradiations may be with a laser source. In other such aspects, one irradiation may be with a laser source and the other with an electron beam source. In still other such aspects, both irradiations may be with an electron beam source, optionally focused using one or more magnets. In some aspects, the different energy sources may be two separate energy sources, such as two laser sources, two electron beam sources each optionally focused using one or more magnets, or one laser source and one electron beam source, the electron beam source being optionally focused using one or more magnets. In other aspects, the different energy sources may be created from a single energy source (i.e., a single laser source or a single electron beam source) by using a splitter, optionally with separate galvo scanners, separate magnets, or other separate optics.

Figure 3C:
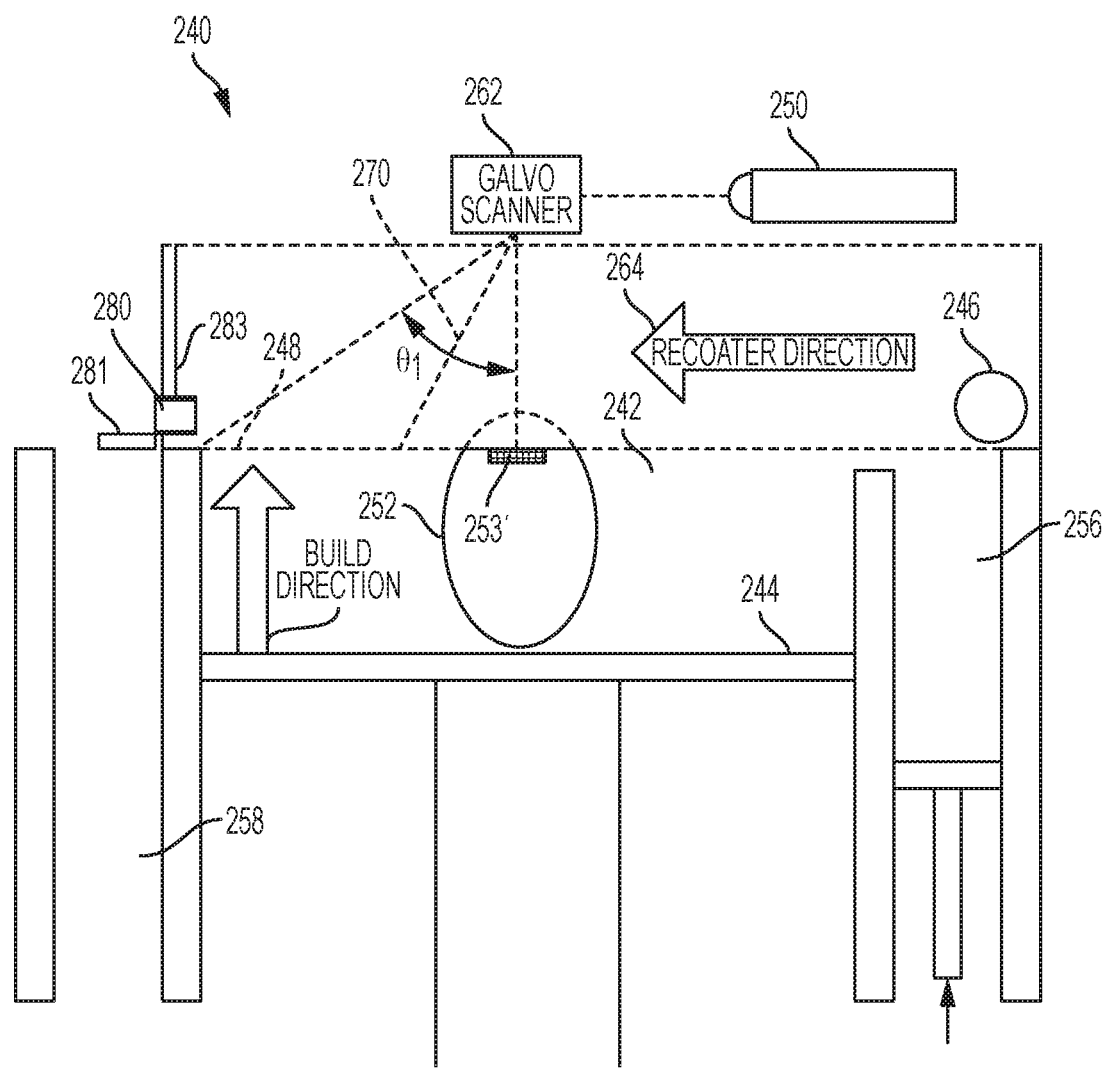
FIG. 3C shows a schematic diagram of removing the confinement medium by a separate positioning unit after irradiation through the confinement medium, according to a second embodiment of the present disclosure.

After irradiation to form modified region 253', the confinement medium 281 may be removed and discarded, by any suitable means. In some aspects, dispenser unit 280 is further configured to remove confinement medium 281. In some aspects, dispenser unit 280 is further configured to remove and discard confinement medium 281. In some aspects, confinement medium 281 is discarded into waste container 258 (FIG. 3C). In some aspects, apparatus 240 contains a separate waste container for confinement mediums 281. In some aspects, confinement mediums 281 may be removed and discarded after irradiation to form modified region 253'. In some aspects, confinement mediums 281 may be removed and discarded before irradiation to form modified region 253', for example, if confinement medium 281 is improperly placed.

Figure 3D:
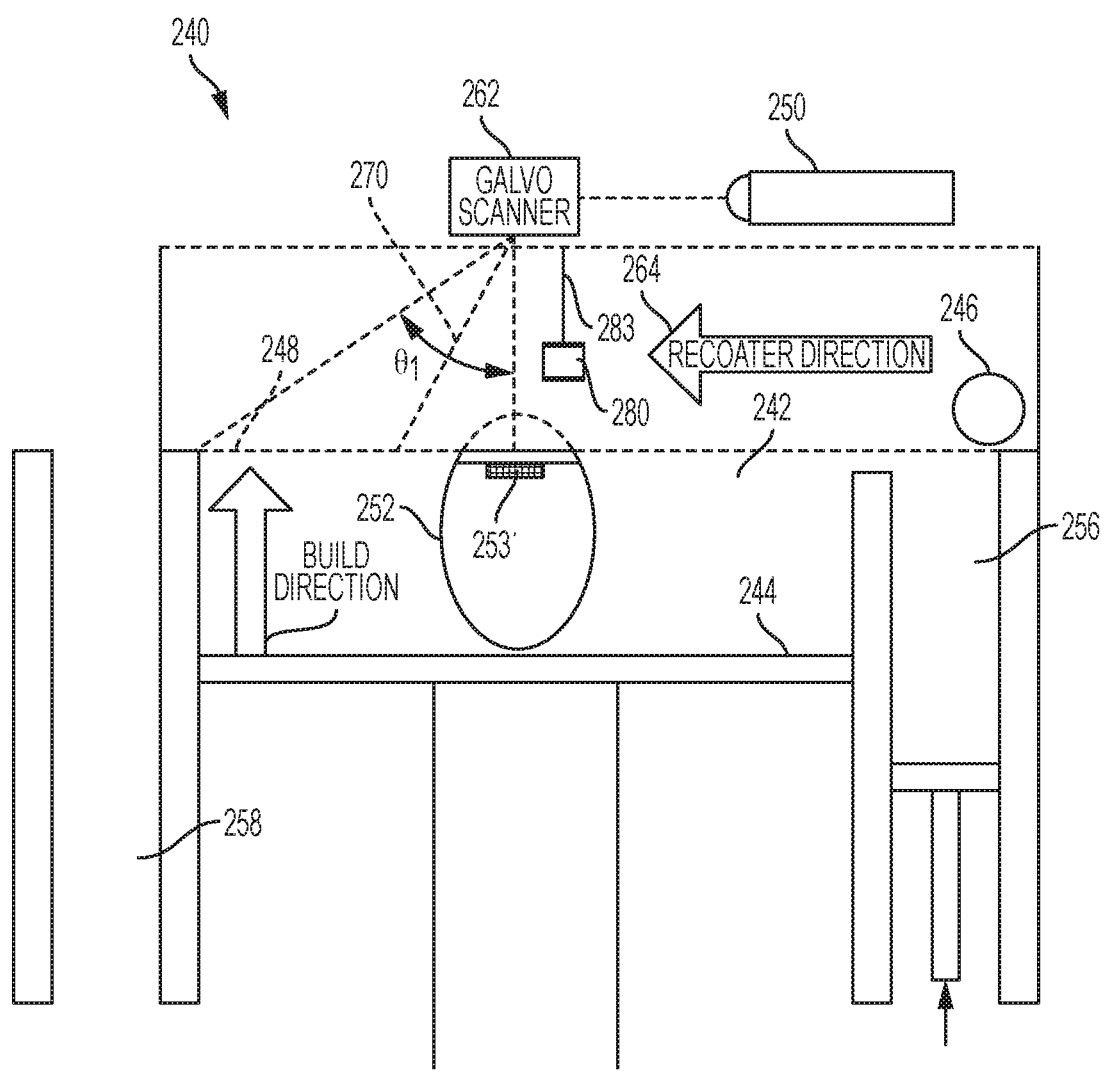
FIG. 3D shows a schematic diagram of applying and solidifying a subsequent layer of build material over the solidified layer formed as shown in FIG. 2D, according to a second embodiment of the present disclosure.

After removal of confinement medium 281 after forming modified region 253', build plate 244 is lowered, and recoater arm 246 evenly spreads a subsequent layer of build material over powder bed 242 and the most recently solidified layer of object 252 (see FIG. 3D). In some aspects, the subsequent layer of build material is spread over the modified region 253'. In some aspects, no subsequent layer of build material is spread over the modified region 253'. The energy beam 270 sinters or melts a cross-sectional layer of the object 252 being built under control of an irradiation emission directing device, such as a galvo scanner 262. The build platform 244 is lowered and another layer of powder is spread over the powder bed and object being built, followed by successive melting/sintering of the powder by the laser 250. The powder layer is typically, for example, 10 to 100 microns in thickness. The process is repeated until the object 252 is completely built up from the melted/sintered powder material. The laser 250 may be controlled by a computer system (not shown) including a processor and a memory. The computer system may determine a scan pattern for each layer and control laser 250 to irradiate the powder material according to the scan pattern. After fabrication of the object 252 is complete, various post-processing procedures may be applied to the object 252. Post processing procedures include removal of excess powder by, for example, blowing or vacuuming. Other post processing procedures include a stress release process. Additionally, thermal and chemical post processing procedures can be used to finish the object 252.

As shown in FIGS. 3A-3D, the dispenser unit 280, may be advantageously attached to a positioning unit (e.g., positioning unit 283) to allow two- or three-dimensional movement of the dispenser unit 280 around the build environment.

Figure 3E:
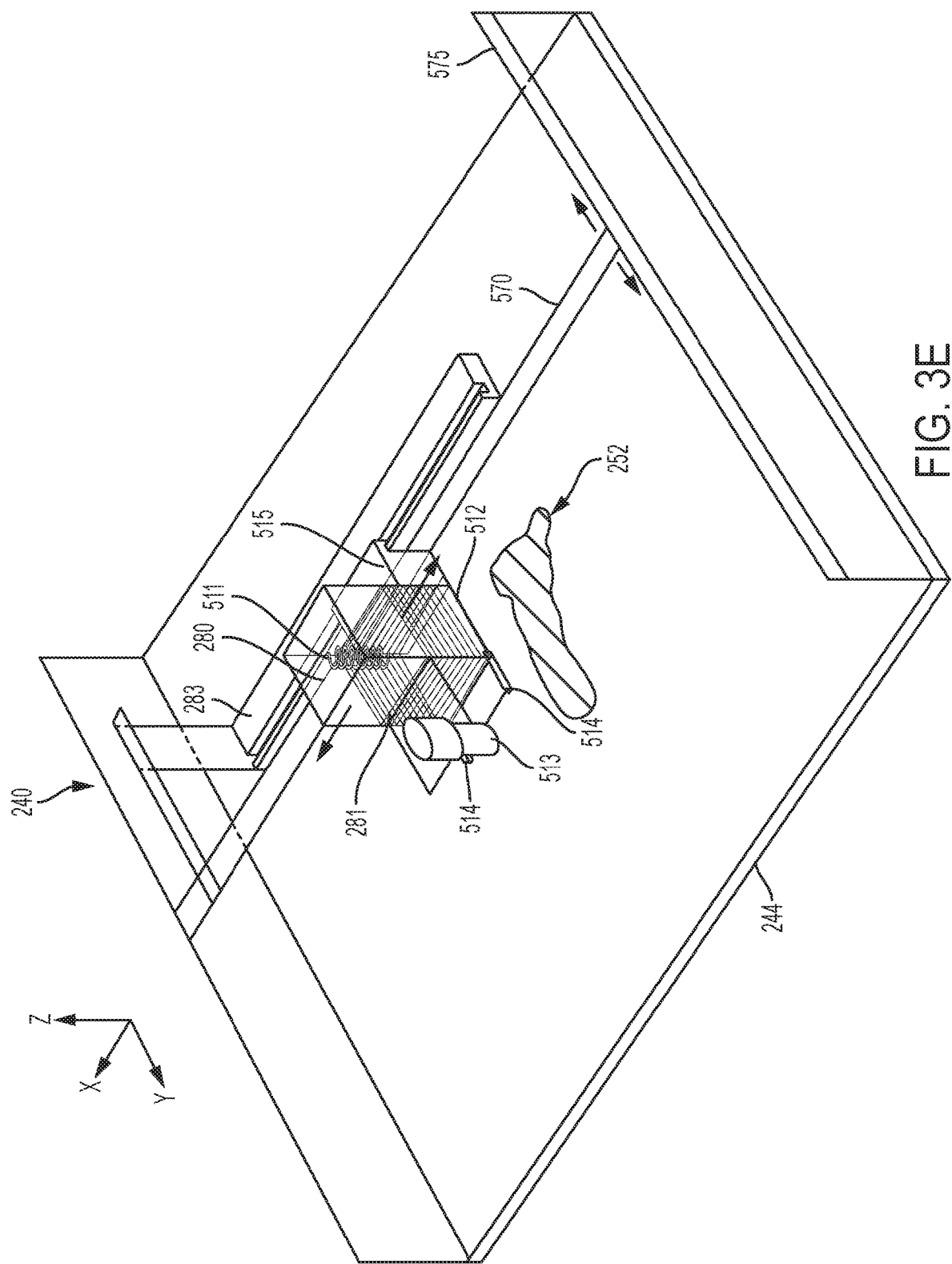
FIG. 3E shows an alternate example of a dispenser unit for use according to a second embodiment of the present disclosure.

FIG. 3E shows an example of a dispenser unit 280 attached to a positioning unit 283. The positioning unit 283 may be a motorized robotic arm, e.g., robotic arm 283 of FIG. 3E, separate from the recoater arm 246, and positioning unit 283 is preferably computer-controlled. In another aspect, the positioning unit 283 may be a gantry, e.g., an X-Y-Z gantry, whereby a plurality of rails or crossbeams, drive belts, drive screws, and/or a Cartesian gantry may be utilized to position the dispenser unit close to the powder bed 242. In yet further alternative aspects, the positioning unit 283 may be a delta robot, a cable robot, a belt drive, or the like. In some aspects, motion of the dispenser unit 280 along rail 570 and/or using positioning unit 283 as a rail allows movement and positioning of dispenser unit 280 in one dimension (e.g., as indicated by the "X" arrow in FIG. 3E), and motion of rail 570 along sidewalls 675 allows movement and positioning of dispenser unit 280 in a second dimension (e.g., as indicated by the "Y" arrow in FIG. 3E). In addition, motion of the build surface may allow movement and positioning of dispenser unit 280 in a third dimension (e.g., as indicated by the "Z" arrow in FIG. 3E) in some aspects.

A key aspect of the invention is the need for the confinement medium 281 to be somehow contained and/or released close to the build surface. This is because, if the confinement medium 281 is not confined or released sufficiently close to the build surface, it would be difficult to control precisely where the confinement medium 281 is deposited. It is necessary that the confinement medium 281 is released no more than 2 cm away from the build surface in order to be sufficiently close, preferably 0.01-0.1 cm. Preferably, the confinement medium is dispensed to make contact with the build surface. In other aspects, the confinement medium is dispensed to leave a gap of no more than 0.1 mm between the confinement medium and the build surface. The gap may be established and/or measured by any suitable means known in the art. For this reason, it may be advantageous that the positioning unit 283 in FIG. 3E is operable to further move and position the dispenser unit 280 in a vertical direction (e.g. as indicated by the arrow "Z" in FIG. 3E). Additionally, in certain embodiments, the positioning unit 283 (FIG. 3E) may be operable to move and position the dispenser unit 280 in direction 264 (FIGS. 3A-3D) or the direction indicated by the arrow "Y" in FIG. 3E. Additionally, movement along the length of the positioning unit 283 itself (e.g. as indicated by the arrow 'X' in FIG. 3E) allows movement and positioning in a second direction. Importantly, the proximity of the dispenser unit 280 on positioning unit 283 to the powder bed 242 ensures that the dispenser unit 280 is sufficiently close to the powder bed 242 and the build surface. Movement along the length of the positioning unit 283 may be facilitated using a drive motor and a linear gear mechanism, a drive motor and drive belt, slot-electric motor drive, or a mag-lev (magnetic levitation) drive.

FIG. 3E shows a close-up view of dispenser unit 280 attached to a positioning unit 283, according to a second embodiment of the present disclosure. In some aspects, dispenser unit 280 comprises a spring 511, a slide piston 512, a vacuum piston 513, one or more guide rails 514, and one or more confinement mediums 281. A confinement medium 281 is pushed, via slide piston 512, onto guide rails 514 and vacuum piston 513. Vacuum piston 513 then deposits confinement medium 281 onto at least a portion 253 of one or more fused or solidified regions of the most recently solidified or fused layer of build material in the manufacture of object 252. In some aspects, slide piston 512 may be coupled to a gas source to facilitate pushing of confinement medium 281 (and partial release of spring 511) onto guide rails 514 and vacuum piston 513.

FIG. 3E shows a close-up view of dispenser unit 280 attached to positioning unit 283, according to a second embodiment of the present disclosure. The dispenser unit 280 shown in FIG. 3E may have identical features to that shown in FIG. 2E. All aspects described with respect to dispenser unit 280 attached to recoater arm 246 (FIG. 2E) apply with equal force to dispenser unit 280 attached to positioning unit 283 (FIG. 3E).

FIG. 3E shows the housing 515 which serves not only as a frame to hold the dispenser unit 280 with spring 511, slide piston 512, vacuum piston 513, and guide rails 514, but to also position the placement of confinement mediums 281, e.g., a stack of glass slides. The vacuum piston 513 and guide rails 514 extending downward (i.e. away from spring 511 and toward the build surface) ensure that the confinement medium 281 is placed on the build surface. The small gap existing between the bottom of the guide rails 514 and the build surface allows clearance allowing movement of the positioning unit 283. The vertical movement of the dispenser unit 280 allows removal of confinement mediums 281 from the build surface. The additional vertical movement provided in this embodiment is useful in systems with lowering build plates (e.g., as shown in FIG. 1) as well as systems having a stationary build plate, including but not limited to those described in the following patent applications:

U.S. patent application Ser. No. 15/406,467, titled "Additive Manufacturing Using a Mobile Build Volume," and filed Jan. 13, 2017.

U.S. patent application Ser. No. 15/406,454, titled "Additive Manufacturing Using a Mobile Scan Area," and filed Jan. 13, 2017.

U.S. patent application Ser. No. 15/406,444, titled "Additive Manufacturing Using a Dynamically Grown Build Envelope," and filed Jan. 13, 2017.

U.S. patent application Ser. No. 15/406,461, titled "Additive Manufacturing Using a Selective Recoater," and filed Jan. 13, 2017.

U.S. patent application Ser. No. 15/406,471, titled "Large Scale Additive Machine," and filed Jan. 13, 2017.

The disclosures of these applications are incorporated herein in their entirety to the extent that they disclose additional aspects of additive manufacturing methods and apparatuses that can be used in conjunction with those disclosed herein.

The methods and apparatuses described herein may be used with any build material suitable for use in additive printing, as will be known to those of ordinary skill in the art. In some aspects, the build material is a powdered metal. In some aspects, the build material is cobalt chrome.

The methods and apparatuses of the present disclosure may be used in conjunction with additive printing methods known in the art, including, but not limited to direct metal laser melting (DMLM), stereolithography (SLA), selective laser melting (SLM), and other powder-based processes. In some aspects, the present disclosure is related to a method of fabricating an object using DMLM. In some aspects, the methods and systems of the present disclosure may be used in conjunction with DMLM methods comprising building at least one layer of a chamber wall, providing a layer of powder within the at least one layer of a chamber wall by passing a recoater arm over the layer of powder, irradiating the layer of powder to form a fused region, and then repeating until the object is formed within the chamber wall. The following patent applications include disclosure of these various aspects and their use:

U.S. patent application Ser. No. 15/406,467, titled "Additive Manufacturing Using a Mobile Build Volume," and filed Jan. 13, 2017.

U.S. patent application Ser. No. 15/406,454, titled "Additive Manufacturing Using a Mobile Scan Area," and filed Jan. 13, 2017.

U.S. patent application Ser. No. 15/406,444, titled "Additive Manufacturing Using a Dynamically Grown Build Envelope," and filed Jan. 13, 2017.

U.S. patent application Ser. No. 15/406,461, titled "Additive Manufacturing Using a Selective Recoater," and filed Jan. 13, 2017.

U.S. patent application Ser. No. 15/406,471, titled "Large Scale Additive Machine," and filed Jan. 13, 2017.

The disclosures of these applications are incorporated herein in their entirety to the extent that they disclose additional aspects of additive manufacturing methods and apparatuses that can be used in conjunction with those disclosed herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method of fabricating an object, comprising:
    (a) irradiating at least a portion of a given layer of build material with an energy source to form at least one solidified region;
    (b) providing a subsequent layer of build material;
    (c) repeating steps (a) and (b) until the object is formed;
    (d) at least one step of placing a confinement material over the at least one solidified region;
    (e) at least one step of irradiating, through the confinement medium, at least one portion of the solidified region to modify the density or microstructure of the solidified material with minimal ablating or melting of the solidified material,
    wherein step (e) comprises at least one step of irradiating, through the confinement medium, the at least one portion of the solidified region to form a localized laser shock peening therein, and
    after (e), removing the confinement medium from the at least one portion of the solidified region.

2. The method of claim 1, further comprising removing the confinement medium after the at least one step of irradiating the at least one portion of the solidified region through the confinement medium.

3. The method of claim 1, wherein the build material is a powdered metal.

4. The method of claim 1, wherein the irradiating in step (a) and the irradiating in step (e) are carried out with the same laser source.

5. The method of claim 1, wherein the irradiating in step (a) and the irradiating in step (e) are carried out with different energy sources.

6. The method of claim 5, wherein the irradiating in step (a) is with an electron beam source.

7. The method of claim 1, wherein the at least one step of irradiating the at least one portion of the solidified region modifies the at least one portion of the solidified region, to form a modified solidified region, wherein the modified solidified region differs from the solidified region in one or more of the following ways:
    the modified solidified region is more opaque to x-rays than the solidified region;
    the modified solidified region is more opaque to radioactivity than the solidified region;
    the modified solidified region has a different density than the solidified region;
    the modified solidified region has a different microstructure than the solidified region;
    the modified solidified region has different internal stresses from the solidified region; and
    the modified solidified region has a different absorbance energy than the solidified region as measured by computed tomography (CT) scanning.

8. The method of claim 7, wherein the microstructure of the modified solidified region includes a difference in one or more of the crystalline structure, grain size, or grain orientation compared to the microstructure of the solidified region.

9. The method of claim 1, wherein the confinement medium is selected from glass, polymer, quartz, multi-layered materials, and liquid-filled capsules.

10. An apparatus for metal-based additive manufacturing, comprising:
    a laser source;
    a powder dispenser;
    a confinement medium dispenser;
    an electron beam source;
    a positioning unit to move the confinement medium dispenser in at least two dimensions, and
    wherein the powder dispenser comprises a recoater arm moveable in a first direction, and wherein the confinement medium dispenser is attached to the recoater arm, wherein the confinement medium dispenser is moveable with the recoater in the first direction and moveable along the recoater arm in a second direction.

11. The apparatus of claim 10, further comprising a galvo scanner.

12. The apparatus of claim 10, further comprising a confinement medium storage container.

13. The apparatus of claim 10, wherein the powder is a metal powder.

14. The apparatus of claim 10, wherein the confinement medium dispenser is adapted to dispense a confinement medium onto a layer of a solidified build material.

15. The apparatus of claim 10, wherein the confinement medium is selected from glass, polymer, quartz, multi-layer materials, and liquid-filled capsules.

16. The apparatus of claim 10, wherein the confinement medium dispenser is not attached to the recoater arm.

* * * * *